United States Patent
Kawasaki et al.

(10) Patent No.: US 7,123,243 B2
(45) Date of Patent: Oct. 17, 2006

(54) TOUCH PANEL INTEGRATED TYPE DISPLAY APPARATUS

(75) Inventors: Kenichi Kawasaki, Tokyo (JP); Hitoshi Nakada, Saitama (JP); Masami Tsuchida, Saitama (JP)

(73) Assignee: Pioneer Corporation, Tokyo (JP)

( * ) Notice: Subject to any disclaimer, the term of this patent is extended or adjusted under 35 U.S.C. 154(b) by 341 days.

(21) Appl. No.: 10/402,957

(22) Filed: Apr. 1, 2003

(65) Prior Publication Data

US 2003/0184528 A1  Oct. 2, 2003

(30) Foreign Application Priority Data

Apr. 1, 2002 (JP) ............................ P2002-099312

(51) Int. Cl.
*G09G 5/00* (2006.01)
(52) U.S. Cl. ........................ 345/173; 345/169; 345/691
(58) Field of Classification Search ................ 345/691, 345/173, 169
See application file for complete search history.

(56) References Cited

U.S. PATENT DOCUMENTS

| | | | | |
|---|---|---|---|---|
| 4,972,496 A | * | 11/1990 | Sklarew | 382/187 |
| 5,543,588 A | | 8/1996 | Bisset et al. | |
| 5,896,575 A | | 4/1999 | Higginbotham et al. | |
| 6,067,074 A | * | 5/2000 | Lueders | 345/156 |
| 6,297,752 B1 | * | 10/2001 | Ni | 341/22 |
| 2002/0140363 A1 | * | 10/2002 | Shimoda et al. | 315/169.3 |

FOREIGN PATENT DOCUMENTS

GB         2 344 905 A      6/2000

* cited by examiner

*Primary Examiner*—Kent Chang
*Assistant Examiner*—Tammy Pham
(74) *Attorney, Agent, or Firm*—Sughrue Mion, PLLC

(57) ABSTRACT

A touch panel integrated type display apparatus has a display portion on one surface and a touch panel on the other surface. An input screen for operating the touch panel is displayed on a display plane of the display portion, and an operating position of the touch panel recognizable on the display plane referring to the input screen.

7 Claims, 6 Drawing Sheets

TOUCH PANEL INTEGRATED TYPE DISPLAY APPARATUS

The present disclosure relates to the subject matter contained in Japanese Patent Application No. 2002-99312 filed Apr. 1, 2002, which is incorporated herein by reference in its entirety.

BACKGROUND OF THE INVENTION

1. Field of the Invention

This invention relates to a touch panel integrated type display apparatus, and more particularly to a touch panel integrated type display apparatus suited for a mobile instrument such as a PDA (Personal Digital Assistants), a portable telephone, etc.

2. Description of the Related Art

In a mobile instrument such as a PDA (Personal Digital Assistants), a portable telephone, an input interface of a touch panel integrated type display apparatus is designed such that when there is a touch to a touch key (e.g. icon) graphically displayed on a display portion of liquid crystal and the like, a touch sensor detects the touch to the touch key to make a predetermined input.

Now referring to the drawing, an explanation will be given of a conventional touch panel integrated type display apparatus. FIG. 6 is a schematic perspective view showing a conventional touch panel integrated type display apparatus. FIG. 7 is a sectional view taken along line A—A in FIG. 6.

A mobile instrument 100 shown in FIGS. 6 and 7 is provided with a touch panel integrated type display apparatus 103 formed at a part of a chassis 105 and an operation button 104 formed on the side of its display plane 103a.

Further, the touch panel integrated type display apparatus 103, as seen from FIG. 7, includes a liquid crystal display device 102 and a touch panel 101 bonded to its light emitting plane. The touch panel integrated display device 103 performs an input operation by touching with a finger or a pen to the display plane 103a on which an image or touch key (e.g. icon) graphically displayed is displayed.

In recent years, the display screen on a mobile instrument as described above has been implemented in color or as a high quality image.

However, when a touch panel input is made for the touch panel integrated type display apparatus by a finger or a pen, finger prints or dirt will be deposited on the display plane or flaws by a pen point will be made thereon. When a high definition image is displayed, the fingerprints, dirt or flaws are conspicuous so that the cleanness of the high definition image thus displayed will be deteriorated.

SUMMARY OF THE INVENTION

In view of the circumstance described above, this invention intends to provide a touch panel integrated type display apparatus in which the display plane of a display portion is not got soiled by an input operation for a touch panel and cleanness of a high definition image is not deteriorated.

According to a first aspect of the invention, there is provided a touch panel integrated type display apparatus including: a display portion provided on one surface of the touch panel integrated type display apparatus, the display portion having a display plane; and a touch panel provided on the other surface of the touch panel integrated type display apparatus, wherein an input screen for operating the touch panel is displayed on the display plane of the display portion, and an operation position on the touch panel is recognizable on the display plane referring to the input screen.

In this configuration, a user can perform an input operation without touch to the display plane of the display portion. Therefore, no finger print or dirt will be deposited on the display plane and cleanness of a high definition image displayed on the display portion is not deteriorated.

In addition, since the user can recognize the operation position from the display plane, the operability is not lost.

According to a second aspect of the invention, the touch panel and the display portion have optical transparency so that the operation position on the touch panel is visually recognizable from the display portion.

In this configuration, where the user performs an input operation with a touch of a finger or a pen to the input detecting portion of the touch panel, the user can perform the input operation while seeing, from one display plane, the finger or pen operating the touch panel on the other plane. This permits an easy and sure input operation.

According to a third aspect of the invention, the display portion is constructed of an organic EL display device.

Since the organic EL display device spontaneously emits light, it does not have an illuminating section such as a backlight or front light which impedes optical transparency, as used in a liquid crystal display device. This easily assures the optical transparency of the display portion.

Further, since the organic EL display device has a wide angle of view, provides sufficient brightness, and does not have a light conducting plate which is used as the back light or front light, thickness of the apparatus can be reduced.

According to a fourth aspect of the invention, the touch panel is provided with a display plane for displaying the input screen, and the touch panel is made operable to touch the input screen displayed on the display plane of the touch panel.

In this configuration, since the touch panel is provided with the display plane for displaying the input screen, it can be operated in the same manner as a general touch panel.

According to a fifth aspect of the invention, the apparatus further includes a detector for detecting the front and rear of the touch panel and the display portion; and a switching section for switching an angle of view of an organic EL based on a detection result of the detector.

In this configuration, since the input screen can be always displayed as a front plane (seen from the user) on the basis of the detection of the front or back of the touch panel, the user can perform the input operation smoothly.

According to a sixth aspect of the invention, the display portion is constructed of a liquid crystal display device.

In this configuration, since the display portion is constructed of a liquid crystal display device, production cost can be reduced by adopting a conventional technique for manufacturing the liquid crystal display device.

According to a seventh aspect of the invention, the display portion is constructed of a liquid crystal display device, and an illuminating section which constitutes the liquid crystal display device is disposed at the end portion.

In this configuration, since the display portion is constructed of a liquid crystal display device with the illuminating section (back light or front light) disposed at the end portion, the optical transparency at the other area opposite to the end portion of the display portion can be obtained so that the operation position on the touch panel can be visually recognized from the display portion and the input operation can be done easily and surely.

According to an eighth aspect of the invention, an indicator which follows an operation on the touch panel is displayed on the display plane and the operation position on the touch panel is recognizable by the pointer.

In this configuration, since the indicator (e.g. pointer) which follows the finger or pen operating the touch panel is displayed on the one display plane, the operation position of the touch panel can be recognized by the indicator. This permits the position of a predetermined touch key (e.g. icon) of input detecting portion to be surely designated.

Further, According to a ninth aspect of the invention, the apparatus further includes a changing section for changing the arrangement of the input screen displayed on the display plane according to an operation mode of the touch panel.

In this configuration, the arrangement of an input screen can be changed into those preferred to different operation modes where the touch panel is operated by right hand, the touch panel is operated by left hand, the touch panel is operated with a pen, etc.

DETAILED DESCRIPTION OF THE PREFFERED EMBODIMENTS

Figure 1:
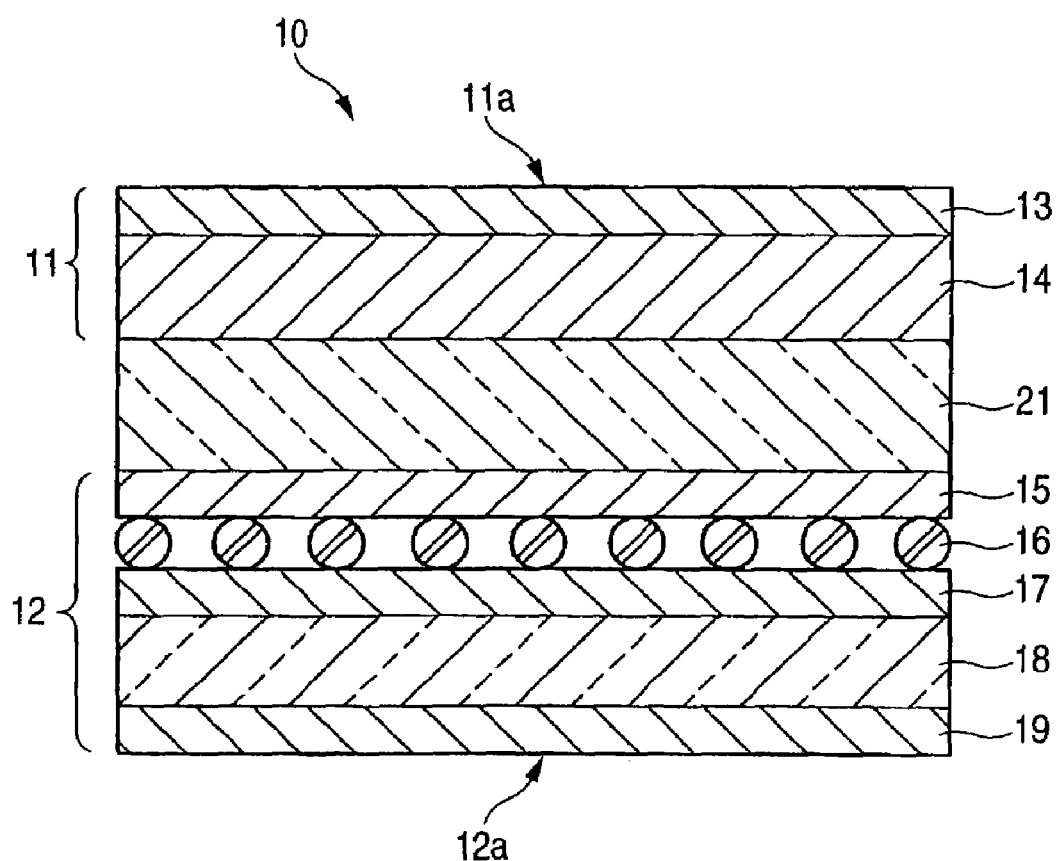
FIG. 1 is a schematic sectional view of a touch panel integrated type display apparatus according to a first embodiment of the invention.

Now referring to the drawings, a detailed explanation will be given of embodiments of the invention.

First Embodiment

The first embodiment according to the invention will be described. FIG. 1 is a schematic sectional view of a touch panel integrated type display apparatus according to the first embodiment.

A touch panel integrated type display apparatus 10 shown in FIG. 1 that is a sectional view thereof includes a display portion 1 provided on one surface and a touch panel 12 provided on the other surface.

The display portion 11 includes a display 14 and a hard coat layer 13 for protecting its surface.

The touch panel 12 includes a pair of transparent electrodes 15 and 17 arranged opposite to each other through a dot spacer 16, a glass layer 18 arranged on the rear surface side of the transparent electrode 17 and a hard coat layer 19 arranged on the surface (i.e. rear surface of the touch panel integrated type display apparatus 10) of the glass layer 18. Instead of the glass layer, a film may be used.

In order to reinforce the strength of the device, a reinforcing material 21 of an optically transparent substance may be inserted between the display portion 11 and touch panel 12.

The above respective portions are made of optically transparent substances so that the operation position by the finger or pen on an input detecting portion 12a of the touch panel can be visually recognized.

In many cases, the mobile instrument such as a PDA, portable telephone, etc. is used while it is held by a hand. In such a case, with the mobile instrument equipped with a touch panel integrated type display apparatus being held by one hand, an input operation is generally conducted by touching to the touch key by a finger or a pen by the other hand. In the touch panel integrated type display apparatus 10 according to this embodiment, a user can perform input operation with only one hand as described below.

The input detecting portion 12a of the touch panel integrated type display apparatus is provided on the side of the rear surface opposite to the display plane 11a of the display portion. While seeing the contents displayed on the display plane 11a and visually recognizing the finger reached the side of the rear surface, the user performs the input operation by touching a finger to a predetermined position of the input detecting portion 12a corresponding to the touch key (e.g. icon) on the input screen displayed on the display plane 11a.

Figure 2:
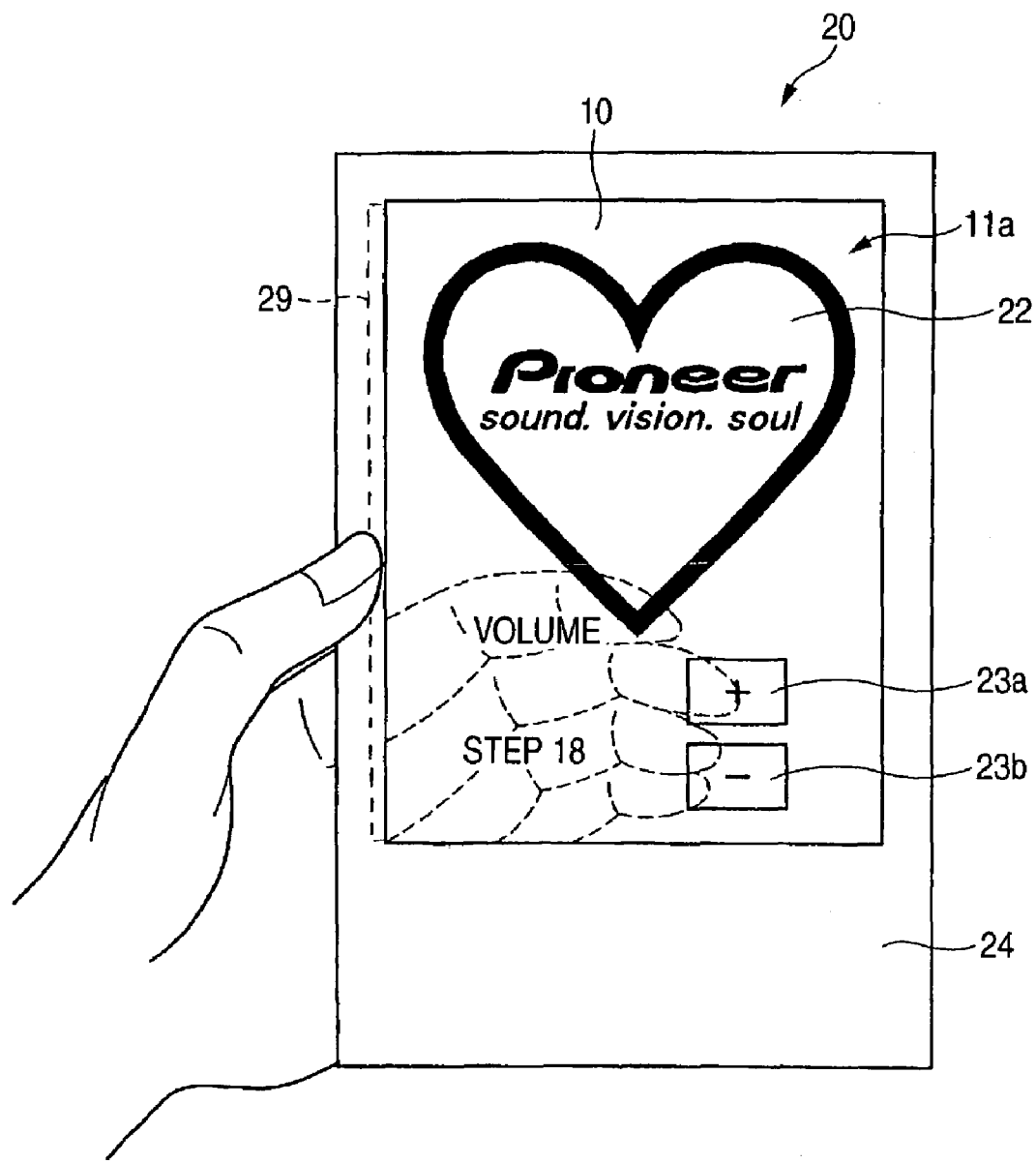
FIG. 2 is a view showing a display plane of a display portion in a state where the touch panel integrated type display apparatus is mounted in a mobile instrument.

Referring to FIG. 2, this operation will be explained. FIG. 2 shows a display plane of the display portion in a state where the touch panel integrated type display apparatus is mounted in a mobile instrument.

In FIG. 2, a mobile instrument 20 has a touch panel integrated type display apparatus 10 mounted in a part of a chassis 24. On a display plane 11a of the touch panel integrated type display apparatus 10, an image 22 and input screen are displayed. A user can visually recognize the fingers for performing the input operation for the input detecting portion 12a of the touch panel provided on the side of the rear surface of the touch panel integrated type display apparatus 10.

For example, a display as shown in FIG. 2 is made on the display plane 11a. This display is an example of an input screen for adjusting the volume in which "VOLUME" that is a title of the input screen, "STEP 18" that is an indication of a present sound volume, a touch key "+" 23a for increasing the volume and a touch key "−" 23b for decreasing the volume are displayed on the display plane 11a.

Since the user can visually recognize the finger operating the input detecting portion 12a of the touch panel, he or she can adjust the sound volume in touch of the finger to the touch key "+" 23a or touch key "−" 23b while seeing the finger from the side of the display plane 11a. The present sound volume "VOLUME" is displayed as e.g. "STEP 18".

Such an input screen can be modified or changed for suiting the other purposes than adjusting the sound volume. The user can perform the input operation in the same manner as the case of adjusting the sound volume.

The display 14 of the display portion 11 has optical transparency enough to visually recognize the operation position with the finger or pen through the touch panel 12. A structure of an organic EL (electroluminescent) display device employed as the display 14 having such optical transparency is shown in FIG. 3.

Figure 3:
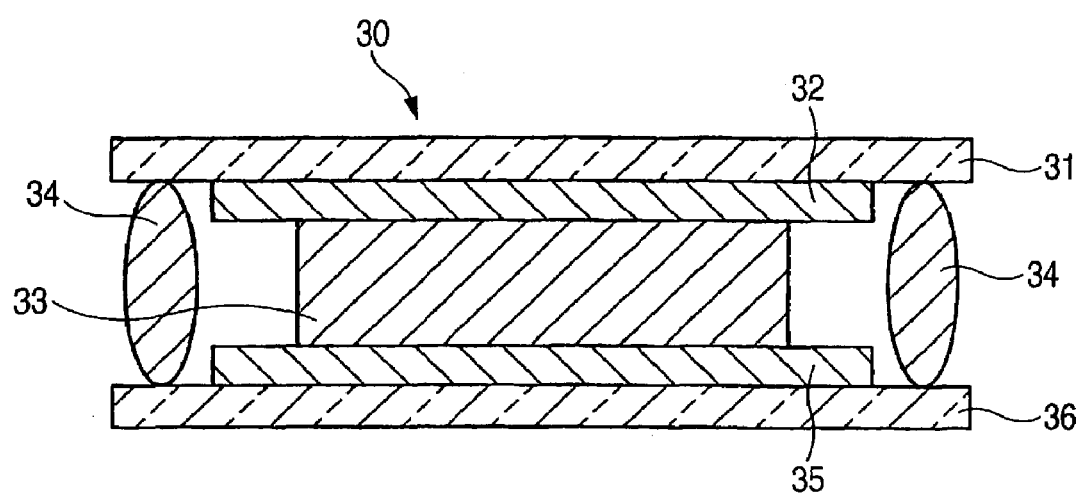
FIG. 3 is a schematic sectional view showing an organic EL display device.

An organic EL display device 30 shown in FIG. 3 includes an organic EL layer 33 containing an organic light-emitting layer which emits light owing to a current. The organic EL layer 33 is sandwiched between a pair of transparent electrodes 32 and 35 which constitute a positive and negative electrode pair. The transparent electrodes are sandwiched between a pair of transparent substrates 31 and 36, and a spacer 34 for protecting the organic EL layer 33 is inserted at the end of the device between the transparent substrates 31 and 36.

The transparent substrates 31 and 36 are made of glass, plastic, ceramic, etc. The transparent electrodes 32 and 35 are made of ITO (indium-tin oxide), SnO (tin oxide), etc. The organic EL layer 33 is formed of a single or multiple layers of organic compound. The multiple layers may include a hole injection layer, a hole transporting layer, a light emitting layer, an electron transporting layer, an electron injection layer, etc. which are deposited and separated from one another based on respective functions.

In case where the organic EL display device is employed as the display portion 11 as described above, the transparent substrate of the touch panel 12 and that of the display portion 11 can be commonized. That is, the transparent substrate of the touch panel 12 may also function as the transparent substrate of the display portion 11. In this case, the thickness of the device can be further decreased.

Incidentally, if the above described display 14 has optical transparency enough to visually recognize the operation position with a finger or a pen through the touch panel 12, the display other than the organic EL display device may be adopted. For example, an LC display device can be adopted in which the display portion is formed so that a backlight 29 is located at the end portion.

Second Embodiment

An explanation will be given of a second embodiment of the invention.

Figure 4:
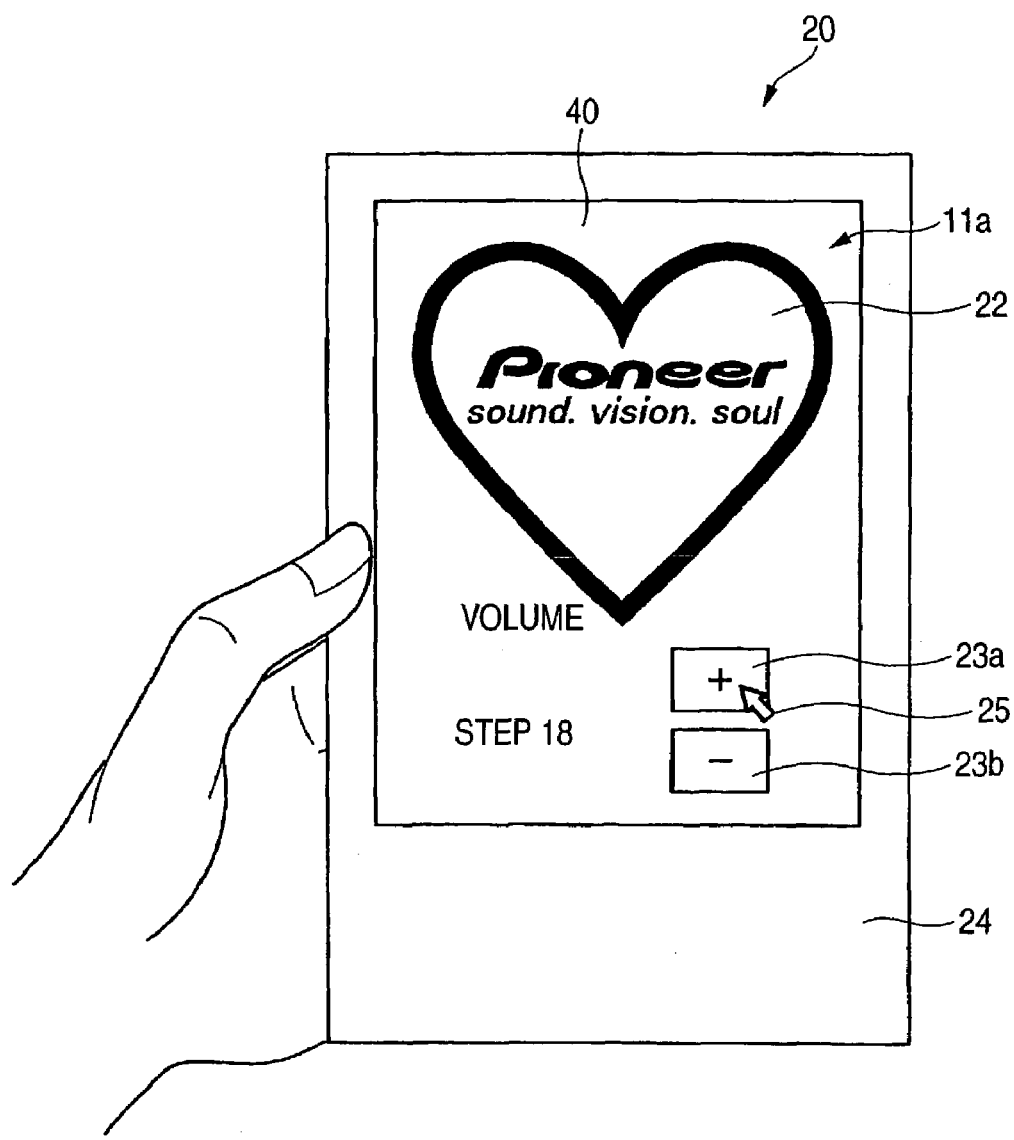
FIG. 4 is a view showing a display plane of a display portion in a state where a touch panel integrated type display apparatus according to a second embodiment is mounted in a mobile instrument.

FIG. 4 shows a display plane of a display portion in a state where a touch panel integrated type display apparatus according to this embodiment is mounted in a mobile instrument. In this embodiment, like numerals refer to like parts in the first embodiment.

A touch panel integrated type display apparatus 40 according to this embodiment, as seen from FIG. 4, displays a portion touched by the finger or pen of a user operating the input detecting portion 12a of the touch panel, using a pointer 25 following the portion. The portion is displayed on the display plane 11a of the display portion by the pointer 25. The user performs an input operation using the pointer 25 by superposing the pointer 25 on a touch key (e.g. icon)

The touch panel integrated type display apparatus 40 according to this embodiment includes a display portion 11 and a touch panel 12. This structure is the same structure as that of the first embodiment shown in FIG. 1. However, in the touch panel integrated type display apparatus 40 according to this embodiment, the pointer 25 is displayed on the display plane 11a so that it is not necessarily required that the user's finger is visually recognized from the side of the display plane 11a. Therefore, the display 14 may be a general liquid crystal display device.

Third Embodiment

Figure 5:
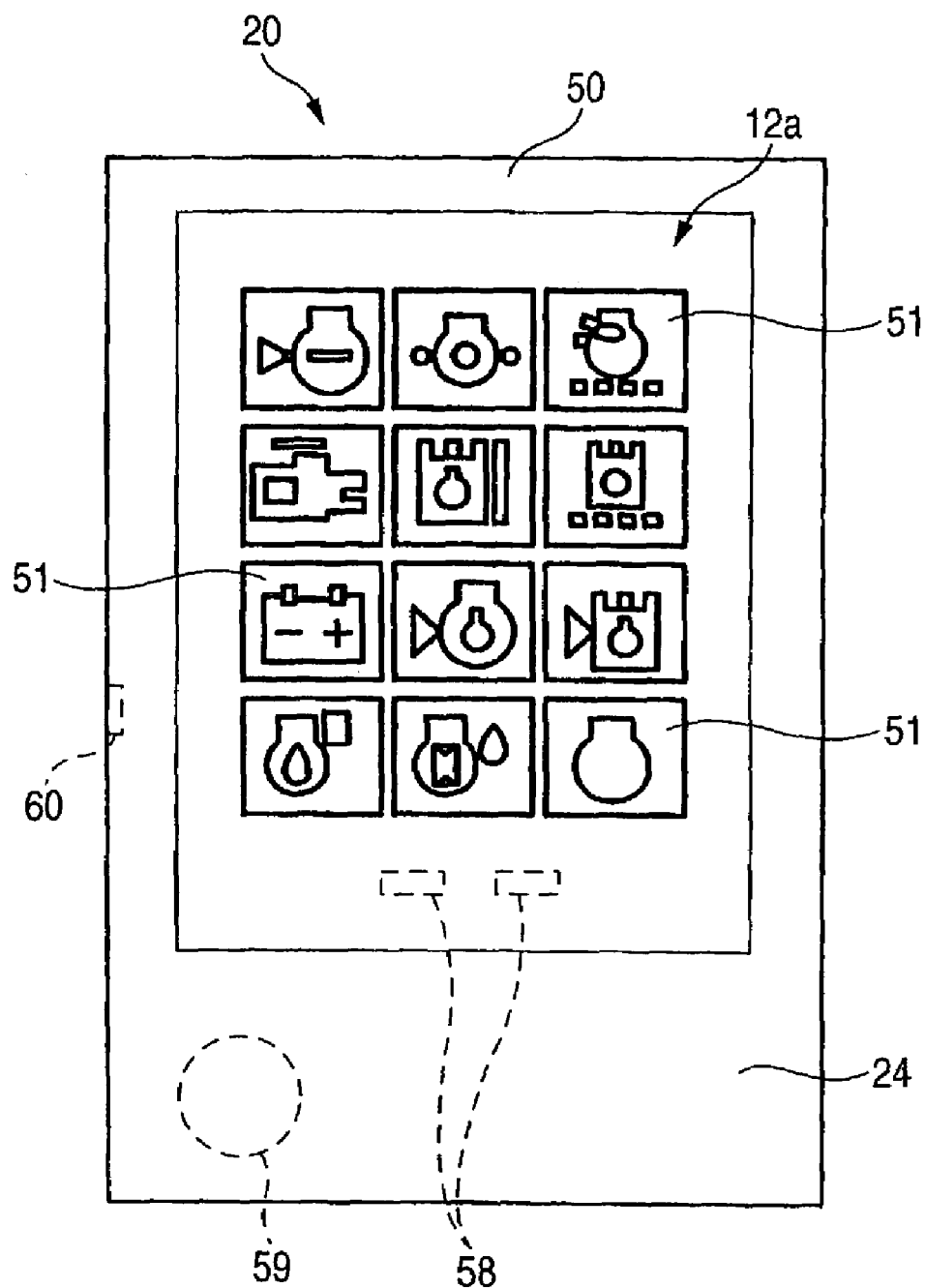
FIG. 5 is a view explaining a state where a touch panel integrated type display apparatus according to a third embodiment is mounted in a mobile instrument and showing a display plane of a touch panel detecting portion.
Figure 6:
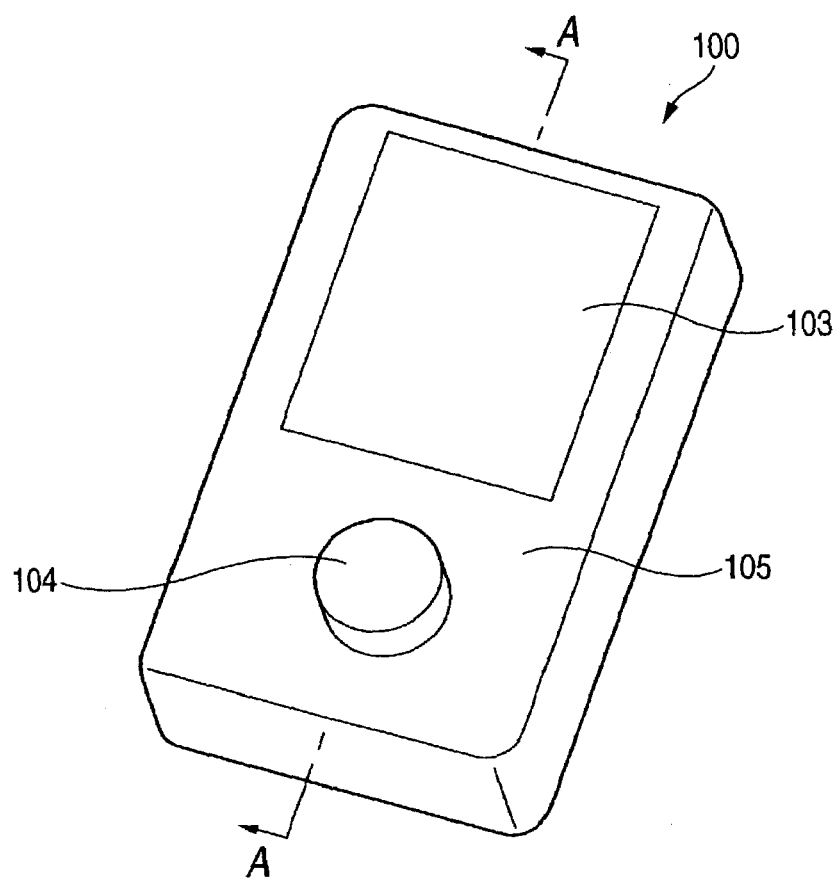
FIG. 6 is a schematic perspective view showing a conventional touch panel integrated type display apparatus.
Figure 7:
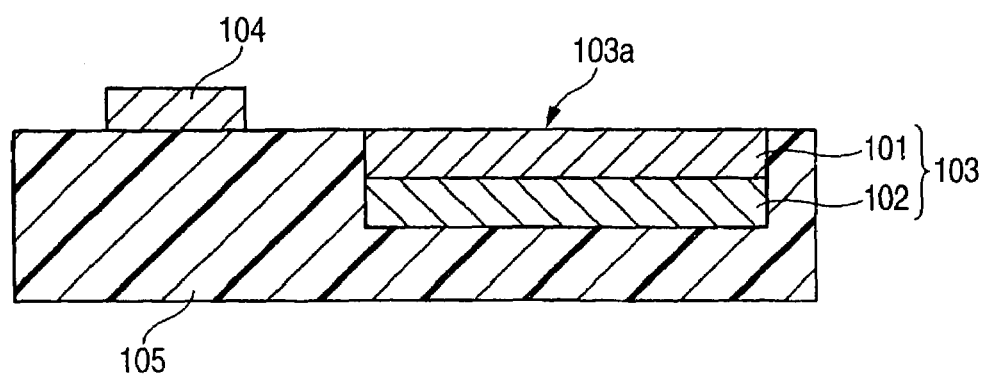
FIG. 7 is a sectional view taken along line A—A in FIG. 6.

An explanation will be given of a third embodiment of this invention. FIG. 5 shows a display plane of a display portion in a state where a touch panel integrated type display apparatus according to this embodiment is mounted in a mobile instrument. In this embodiment, like numerals refer to like parts in the first and the second embodiments.

A touch panel integrated type display apparatus 50 according to this embodiment, as seen from FIG. 5, can display an input screen on the input detecting portion 12a as well. The input detecting portion 12a is provided on the side of the rear surface opposite to the display plane 11a on which a normal image is displayed. The input screen on the input detecting portion 12a permits the same operation to be made as in a general touch panel.

The touch panel integrated type display apparatus according to this embodiment includes a display portion 11 on one surface and a touch panel 12 on the other surface. This structure is the same as that of the first embodiment shown in FIG. 1.

The touch panel integrated type device 50, as seen from FIG. 5, is provided with a display plane for displaying an input screen on the input detecting portion 12a of the touch panel 12. The user performs an input operation while seeing the input screen on the display plane. For example, as shown in FIG. 5, a plurality of touch keys (icons) 51 are displayed on the display plane of the input detecting portion 12a. The user performs an input operation by touching with the finger or pen to these touch keys (ions) 51.

Although not shown, on the display plane 11a of the display portion 11, an ordinary image can be displayed as in the first and the second embodiments described above.

In the touch panel integrated type display apparatus 50 according to this embodiment, in order to provide a display plane on the input detecting portion 12a of the touch panel, an organic EL display device (see FIG. 3) adopted to invert the image data applied to the organic EL element portion and switch an angle of view between the front surface and the rear surface need to be used.

The image data inputted to the organic EL may be inverted on the basis of a detection result of the front or rear of the touch panel and display portion using a sensor 59 such as a gyroscope for detecting a direction, thereby switching the angle of view of the organic EL.

Further, in the first to third embodiments of this invention, the arrangement of the input screen displayed on the display plane may be changed according to the operation mode of the touch panel.

The modes of operating the touch panel include the cases where the touch panel is operated by right hand, the touch panel is operated by left hand, the touch panel is operated with a pen, an input operation is performed with a finger reached the rear surface while the mobile instrument is being held by one hand. The modes of operating the touch panel further includes a case where the input operation is performed with a finger or a pen by visual recognition from the side of the input detecting portion 12a of the third embodiment.

These operation modes have their corresponding preferred arrangements of the touch keys (e.g. icons) or character displays. A touch key (e.g. icons) 58 for changing the arrangement may be provided, the arrangement may be changed.

The means for inhibiting the input from the touch panel 12 can be realized by providing a switch 60 on the side wall of the mobile instrument 20 provided with the touch panel integrated type display apparatus 10, 40, 50 so that a key entry is temporarily locked if the key entry is not necessary.

As understood from the description hitherto made in detail, according to the first aspect of the invention, in the touch panel integrated type display apparatus having a display portion on one surface and a touch panel on the other surface, an input screen for operating the touch panel is displayed on a display plane of the display portion, and an operation position on the touch panel is recognizable on the display plane referring to the input screen.

Therefore, a touch panel integrated type display apparatus can be provided in which a user can perform an input operation without touch to the display plane of the display portion, no finger print or dirt will be deposited on the display plane, cleanness of a high definition image displayed on the display portion is not deteriorated, and, since the user can recognize the operation position from the display plane, the operability is not lost.

According to the second aspect of the invention, since the touch panel and the display portion have optical transparency so that the operation position on the touch panel is adapted to be visually recognizable from the display portion, a touch panel integrated type display apparatus can be provided in which the input operation can be easily and surely done.

According to the third aspect of the invention, since the display portion is constructed of an organic EL display device, a touch panel integrated type display apparatus can be provided in which the optical transparency of the display portion can be easily assured, a wide angle of view and sufficient brightness are obtained, and the thickness of the apparatus can be reduced.

According to the fourth aspect of the invention, since the touch panel is provided with a display plane for displaying the input screen, and the touch panel is made operable to touch the input screen displayed on the display plane of the touch panel, a touch panel integrated type display apparatus can be provided which can be operated in the same manner as a general touch panel.

According to the fifth aspect of the invention, since the touch panel integrated type display apparatus further includes a detector for detecting the front and rear of the touch panel and the display portion, and a switching section for switching an angle of view of an organic EL on the basis of a detection result of the detector, a touch panel integrated type display apparatus can be provided in which the user can perform the input operation smoothly.

According to the sixth aspect of the invention, since the display portion is constructed of a liquid crystal display device, a touch panel integrated type display apparatus can be provided in which production cost can be reduced by adopting a conventional technique for manufacturing the liquid crystal display device.

According to the seventh aspect of the invention, since the display portion is constructed of a liquid crystal display device and an illuminating section which constitutes the liquid crystal display device is provided at the end portion, the optical transparency+ at the other area opposite to the end portion of the display portion can be obtained, and a touch panel integrated type display apparatus can be provided in which the operation position on the touch panel can be visually recognized from the display portion and the input operation can be done easily and surely.

According to the eighth aspect of the invention, since an indicator which follows an operation on the touch panel is displayed on the display plane and the operation position on the touch panel is adapted to be recognizable by the indicator, a touch panel integrated type display apparatus can be provided in which the position of a predetermined touch key (e.g. icon) of input detecting portion can be surely designated.

According to the ninth aspect of the invention, since the touch panel integrated type display apparatus includes a changing section for changing the arrangement of the input screen displayed on the display plane according to an operation mode of the touch panel, a touch panel integrated type display apparatus can be provided in which the arrangement of an input screen can be changed into those preferred to different operation modes.

Where the touch panel integrated type display apparatus according to this invention is employed as a display device for a mobile instrument such as PDA, portable telephone and the like, the user can perform an input operation while holding the mobile instrument by one hand so that the operability of the mobile instrument can be improved.

What is claimed is:

1. A touch panel integrated display apparatus comprising:
   a display portion provided on one surface of the touch panel integrated display apparatus, the display portion having a first display plane; and
   a touch panel provided on the other surface of the touch panel integrated display apparatus,
   wherein a first input screen for operating the touch panel is displayed on the first display plane of the display portion, and
   an operation position on the touch panel is recognizable on the first display plane referring to the first input screen,
   wherein the display portion comprises an organic EL display device, and
   wherein the touch panel is provided with a second display plane on the other surface of the touch panel integrated display apparatus for displaying a second input screen, and the touch panel is made operable by touching to the second input screen displayed on the second display plane of the touch panel.

2. A touch panel integrated display apparatus according to claim 1, wherein the touch panel and the display portion have optical transparency so that the operation position on the touch panel is visually recognizable from the display portion.

3. A touch panel integrated display apparatus according to claim 1, further comprising:
   a detector for detecting front and rear orientation of the touch panel and the display portion, wherein one of the touch panel and the display portion is a front surface and the other is a rear surface; and
   a switching section for switching an angle of view of an organic EL based on a detection result of the detector.

4. A touch panel integrated display apparatus according to claim 1, wherein the display portion comprises a liquid crystal display device.

5. A touch panel integrated display apparatus according to claim 1, wherein the display portion comprises a liquid crystal display device having an illuminating section, and
   the illuminating section is disposed at the end portion of the touch panel integrated display apparatus.

6. A touch panel integrated display apparatus according to claim 1, wherein an indicator that follows an operation on the touch panel is displayed on the first or second display plane whereby the operation position on the touch panel is recognizable by the indicator.

7. A touch panel integrated display apparatus according to claim 1, further comprising a changing section for changing the arrangement of the input screen displayed on the first or second display plane according to an operation mode of the touch panel.

* * * * *